Patented Dec. 26, 1944

2,366,133

UNITED STATES PATENT OFFICE 2,366,133

CONDENSATION OF OLEFIN SULPHONIC ACIDS WITH AROMATIC COMPOUNDS

Chester Merle Suter, Evanston, Ill., assignor to The Procter & Gamble Company, Cincinnati, Ohio, a corporation of Ohio No Drawing. Application December 3, 1941, Serial No. 421,483

12 Claims. (Cl. 260—505)

This invention relates to the process of condensing olefin sulphonic acids with aromatic compounds, and to certain novel aryl substituted alkyl sulphonic acids and sulphonates having surface active properties which may be made by this process.

The present application is a companion case with application Serial Number 346,992, filed July 23, 1940, which disclosed a method of making olefin sulphonic acids and sulphonates, suitable for use as materials in the process of the present invention.

Heretofore aryl substituted alkyl sulphonic acids have been made by several other methods, for example: by reacting an alkyl benzyl chloride with sodium sulphite; or by reacting a sulphonated aliphatic aldehyde with a phenol. The method described hereinafter differs fundamentally from these and other earlier methods, and has certain advantages in its favor, such as ease of manipulation, employment of inexpensive raw materials, wider applicability to many types of aromatic compounds, and high yields of the desired products.

The process of my invention provides a method for making aryl substituted alkyl sulphonic acids, and their salts, of types which have not previously been made and which are not readily producible by any of the previously known methods. Many of the products of the present process are surface active compounds, or interface modifiers, and possess valuable detergent, wetting, dispersing, emulsifying, foaming, or bactericidal properties.

An object of my invention is to prepare useful compounds containing both aromatic and aliphatic groups and having a sulphonate group attached to an aliphatic carbon atom.

A further object is to prepare such compounds by condensing an aromatic compound with an olefin sulphonic acid or its salt. Condensing aromatic compounds with olefin disulphonic acids, as well as with monosulphonic acids, is contemplated.

A further object is to prepare compounds of this general type having valuable surface active properties, including wetting, dispersing, emulsifying, foaming, cleansing, or bactericidal properties, also the ability to catalyze fat hydrolysis.

Other objects will appear in the following description of the invention.

My process produces condensation products of the general type:

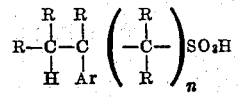

or water soluble salts thereof, wherein each R represents either hydrogen or alkyl and the different R's are not necessarily alike, n is either 1 or 2, and Ar represents an aromatic radical which may contain one or more substituent groups such as the following: alkyl, aralkyl, aryl, hydroxy, alkoxy, hydroxy-alkoxy, aryloxy, keto, acid amido.

To carry out the process of my invention I start with an aryl compound and with an olefin sulphonic acid or sulphonate having a composition and configuration consistent with that desired in the sulphonated alkyl radical of the final condensation product, and preferably having the sulphonate group attached to a carbon atom in an allyl position, i. e. in a position once removed from an olefin double bond. This olefin sulphonate may be prepared by sulphonating an olefin by the method disclosed in the aforementioned application Serial No. 346,992, or by reacting an olefin halide and sodium sulphite according to the well known Strecker reaction, or by oxidation of olefinic mercaptans, or by any other suitable method.

The aryl compound for use in the process may be obtained or prepared in any convenient way, as for example by reacting benzene or naphthalene or a phenol with a halogenated aliphatic hydrocarbon, or with a halogenated petroleum fraction, or with an olefin. If desired, unsubstituted benzene or naphthalene may be employed.

I carry out my process by bringing the chosen sulphonated olefin and the chosen aryl compound into intimate contact, preferably in the presence of a catalyst. The reaction usually occurs at moderate temperature, such as room temperature or somewhat higher. Some heat is generated during the process, and this provides a means of judging the progress of the reaction.

Ordinarily equimolecular proportions of the aryl compound and of the sulphonated olefin are suitably employed, unless for some special reason other proportions are desired, as may be the case if one of these reactants is much more expensive than the other and it is desired to sacrifice some of the less expensive in order to conserve the more expensive, or if one of them serves as a solvent for the other. In some cases, in order to minimize disubstitution of the alkyl sulphonic acid in the aromatic nucleus, it is advantageous to employ an excess of the aromatic compound.

The reaction may be carried out in the presence of a suitable solvent such as ethylene chloride, chloroform, or trichlorethane, although in many cases this is not essential. By a "suitable" solvent I mean one which dissolves both reactants at least to some extent, which does not itself react to a detrimental degree under the conditions of the process, and which is readily separable from the reaction products by evaporation or differential solubility or the like. Polar halogenated solvents are preferred, especially when condensing the higher alkyl benzenes.

A catalyst is usually employed to facilitate the reaction. Strong mineral acids, such as sulphuric or hydrofluoric may be used, or catalysts of the Friedel-Crafts type, which includes aluminum chloride, stannic chloride, boron trifluoride, antimony pentachloride, and titanium tetrachloride. Of the latter type boron trifluoride has been found to be preeminently suitable.

Desirable temperatures for this condensation reaction have been found between 0° and 70° C. or thereabouts, limited of course according to the boiling point of the solvent, if one is used, and to the reactivity of the reactants.

The foregoing discussion of reaction conditions is merely indicative of the general nature of the process, which will be better understood from the specific examples which follow. My process is not necessarily limited to these conditions.

Purification of the condensation reaction product is optional. In some cases, especially when the product is to be used as a surface active agent, the reaction mixture may be satisfactory for the purpose without purification. Usually it is preferable at least to take up the condensation product in water and remove such unreacted aromatic material or other impurities as may be present as an oily layer. After taking up in water the condensation product may be treated with sodium hydroxide or other suitable base to produce a sulphonate. When further purification is desired the sulphonate may be crystallized from solution in water or an organic solvent, or solvent extracted to separate inorganic salts. The purified sulphonate may then be acidulated, if the sulphonic acid is desired, and the resulting inorganic salt separated by suitable means.

In the following examples all parts mentioned are parts by weight. In many of these examples the melting point of the benzyl-thiuronium salt of the aryl substituted alkyl sulphonic acid product is given, because these derivatives are found to have sharp melting points, and to provide a convenient means of identification.

*Example 1.*—(a) To 52 parts of toluene dissolved in 150 parts of chloroform were added 10 parts of sodium isobutylene sulphonate, i. e., 2-methyl, 2-propene sodium sulphonate,

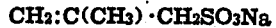

$$CH_2:C(CH_3) \cdot CH_2SO_3Na$$

and 9 parts of concentrated sulphuric acid. Boron trifluoride was bubbled through the well-stirred mixture for one hour. The initial temperature of 30° C. increased to 35° C. After an additional two and one-half hours of agitation at about this temperature, the catalyst was removed by means of a stream of air bubbled through the liquid, and the reaction mixture was diluted with water and neutralized with about 92 parts of 4-normal sodium hydroxide solution. After removing the oily layer with the aid of diethyl ether, the aqueous layer was evaporated to dryness and extracted three times with boiling 95% ethyl alcohol. A high yield of crystals of 2-methyl, 2-(p-tolyl) propane sodium sulphonate was obtained by concentrating the alcoholic solution.

The oily layer which was removed contained unchanged toluene and chloroform, and was usable for reacting with fresh olefin sulphonic acid.

(b) In a similar reaction with toluene and isobutylenesulphonic acid, and with boron trifluoride as catalyst, the solvent was dispensed with and a greater excess of toluene was used instead. A maximum temperature of 42° C. was reached. After neutralizing the diluted reaction mixture with sodium hydroxide and removing the oily layer, the aqueous layer was concentrated until crystals of the sodium salt of the condensation product appeared. These were taken up in water and again crystallized. The product was free from unsaturated material, and gave a benzyl-thiuronium derivative melting at 154–155°.

(c) In a similar reaction both the solvent and the boron trifluoride were dispensed with, and concentrated sulphuric acid served as the catalyst. A mixture of 92 parts of toluene, 73 parts of concentrated sulphuric acid and 20 parts of sodium isobutylene sulphonate was stirred at 0° C. for five hours. The toluene layer was decanted and the acid layer neutralized by pouring into aqueous sodium hydroxide. Clarification of the solution with bone black, concentration, and cooling gave 50 parts of precipitate which after three crystallizations from water and one from hot absolute alcohol gave a purified yield of the condensation product, 2-methyl, 2-(p-tolyl) propane sodium sulphonate.

*Example 2.*—In a reaction similar in all essential respects to Example 1(b), except that sodium 2-propene 1-sulphonate was employed instead of sodium isobutylene sulphonate, a good yield of condensation product was obtained. Its benzyl-thiuronium salt melted at 179–181°.

*Example 3.*—(a) In a reaction similar in all essential respects to Example 1(b), except that normal propylbenzene was employed instead of toluene, a condensation product was obtained whose benzyl-thiuronium salt melted at 89–91°.

(b) In another similar reaction, employing isopropylbenzene instead of toluene, a product was obtained whose benzylthiuronium salt melted at 145–147°.

*Example 4.*—Tertiary amyl benzene was condensed with isobutylene sulphonic acid (the latter formed by mixing 10 parts of the sodium sulphonate and 9 parts of concentrated sulphuric acid) under three different conditions, each with boron trifluoride as catalyst: (a) with ethylene chloride as solvent; (b) with chloroform as solvent; (c) with no solvent other than the amyl benzene.

(a) To a solution of 52 parts of tertiary amyl benzene in 126 parts of ethylene chloride were added 10 parts of sodium isobutylene sulphonate and 9 parts of concentrated sulphuric acid. Boron trifluoride was passed through the well-stirred mixture for one hour and stirring was continued for an additional two and a half hours, after which the remaining boron trifluoride was removed by bubbling air through the mixture. About 92 parts of 4-normal sodium hydroxide solution were added, producing a voluminous precipitate which dissolved when the mixture was warmed on a steam bath. The two layers were separated, and the aqueous layer was evaporated to dryness and the residue extracted four times with hot alcohol. Cooling the alcohol solution gave a good yield of condensation product, which was increased by concentrating and cooling the mother liquor.

Instead of removing the boron trifluoride from the reaction mixture by sweeping it out with air, it may be removed by distillation. In either case, the catalyst may, if desired, be recovered for reuse.

(b) In a reaction similar in all essential respects to Example 1(a), except that 52 parts of tertiary amylbenzene were employed instead of 32 parts of toluene (and similar to Example 4(a), except for the use of chloroform as solvent instead of ethylene chloride) a high yield of 2-(p-tertiary amylbenzyl), 2-methyl propane sodium sulphonate was obtained.

(c) In a reaction similar in all essential respects to Example 1(b), except that 52 parts of tertiary amylbenzene were employed instead of 32 parts of toluene, a somewhat smaller yield of condensation product was obtained, at a reaction temperature of 30–35° C., than in the above reaction of amylbenzene in the presence of a solvent.

Example 5.—(a) 40 parts of normal decylbenzene in 126 parts of ethylene chloride were reacted with 10 parts of sodium isobutylene sulphonate and 9 parts of concentrated sulphuric acid, with boron trifluoride as catalyst, in a manner similar to Example 4(a), to produce the corresponding condensation product.

(b) In a similar reaction 60 parts of commercial "undecylbenzene," a "keryl-benzene," in 126 parts of ethylene chloride were condensed with the olefin sulphonic acid, to produce the corresponding condensation product.

(c) 17.7 parts of normal-dodecylbenzene in 126 parts of ethylene chloride were similarly reacted with 12.5 parts of sodium isobutylene sulphonate and 11 parts of concentrated sulphuric acid, to produce a condensation product, whose benzyl-thiuronium salt melted at 124–125.2° C.

(d) 18.8 parts of tridecylbenzene in 126 parts of ethylene chloride were similarly condensed, to yield a crystalline condensation product.

The sodium salts of all of the condensation products prepared according to Example 5 were found to have sudsing and detergent properties. Other water soluble salts may suitably be prepared, for example, by neutralizing the reaction mixture with potassium hydroxide, ammonium hydroxide, organic amine bases, or the like, instead of with sodium hydroxide. All of these salts have sudsing or detergent properties.

Salts of these condensation products having reduced water solubility may obviously be prepared by neutralizing the condensation product with a suitable heavy metal base, thus producing useful oil soluble sulphonates having surface active properties.

Example 6.—To 23 parts of nonylnaphthalene were added 54 parts of an ethylene chloride solution containing about 13.6 parts of isobutylene-sulphonic acid, while boron trifluoride was bubbled through the mixture. Stirring was continued for five hours, during which a temperature of 50–60° C. was maintained; then water was added, the mixture was neutralized with sodium hydroxide, and evaporated to dryness. The residue was extracted ten times with petroleum ether, by warming with the solvent and then centrifuging. Evaporation of the petroleum ether, extraction of the residue with hot alcohol, and concentration of the alcohol solution produced the sodium sulphonate condensation product. This was found to possess sudsing and detergent properties.

Example 7.—(a) To 33.4 parts of laurylphenol (boiling at 172–178° C. under 5 mm. absolute pressure) was added during a period of one hour 75 parts of ethylene chloride solution containing 9.5 parts of isobutylene sulphonic acid, while boron trifluoride was bubbled through the stirred mixture whose temperature was maintained at about 25° C. After shutting off the flow of catalyst stirring was continued for seven more hours, at room temperature. Water was then added, and the mixture was neutralized with sodium hydroxide. An equal volume of methanol was added to the resulting emulsion, which was then extracted several times with petroleum ether to remove the oily phase (which contained unchanged lauryl phenol suitable for reacting with another lot of the olefin sulphonic acid). The aqueous layer was evaporated to dryness, the residue was extracted with hot 95% ethanol, this extract was cooled, filtered, and evaporated to dryness. A good yield of condensation product was thus produced, having definite detergent and other surface active properties.

(b) The same reactants as in Example 7(a) were brought into intimate contact, but no catalyst was employed, and a temperature of 60° C. was maintained for 90 hours, with stirring. A yield of the condensation product was obtained, but it was less pure than the 7(a) product.

Example 8.—(a) To 68 parts of diphenylether, kept at 70° C., was added with stirring 75 parts of an ethylene chloride solution containing 41 parts of isobutylene sulphonic acid, and stirring was continued for a total of 110 hours. Water was then added, the mixture neutralized with sodium hydroxide, unchanged phenyl ether was removed by steam distillation, and the remaining aqueous solution was evaporated to a weight equivalent to about 140 parts and cooled. A fair yield of crude condensation product, which displayed good foaming properties, resulted.

(b) In a similar condensation anisole was employed instead of diphenylether, producing a condensation product having very high water solubility.

Example 9.—To 82 parts of benzene were added 73 parts of concentrated sulphuric acid, the mixture was cooled to about 5° C., and 10 parts of sodium isobutylene sulphonate were added with stirring. A slight rise in temperature occurred. Half an hour later an additional 10 parts of the sulphonate were added. Stirring was continued over-night at about 25° C., since a sample taken after six hours still showed the presence of unsaturated material when tested with permanganate. The final mixture gave a negative test for unsaturation.

This reaction mixture was neutralized with aqueous sodium hydroxide, and the bulk was reduced by evaporation first to about 200 parts and finally to about half this weight. About 64 parts of a crude crystalline condensation product of benzene and isobutylene sulphonate separated out upon cooling to room temperature. Analysis of a small purified sample of this indicated that it was the disubstitution product,

$$C_6H_4(C_4H_8SO_3Na)_2$$

When a mono-substituted benzene such as a mono-alkyl benzene reacts with an olefin sulphonic acid or sulphonate in my process the sulphonic acid or sulphonate usually condenses in a position which is para to the original substituent. Thus when tertiary butyl benzene condenses with isobutylene sulphonic acid the resulting product is identical with that obtained by photosulphonating para di-tertiary butyl-benzene with sulphuryl chloride and hydrolyzing the resulting sulphonyl chloride. This indicates, furthermore, that when a branched chain olefin sulphonic acid, having the point of branching at the double bond, condenses with an aryl compound in my process the point of attachment to the aromatic nucleus tends to be at the tertiary carbon atom.

The process of my invention is applicable to many types of aromatic compounds and to many different olefin sulphonic acids. Among the suitable aromatic compounds are the benzenes and naphthalenes which may contain substituent groups, including alkyl, aryl, aralkyl, hydroxy, hydroxy-alkoxy, alkoxy, keto, and acid amido groups, all of which may be characterized as groups present in those aromatic compounds which may readily be sulphonated by conventional methods. Aromatic compounds containing two or more substituent groups, which may be alike or different, are suitable.

Those products of my invention which have valuable surface active or interface modifying properties include those having from about eight to about twenty-four total carbon atoms in all aliphatic groups. If the alkyl sulphonate group contains three or four carbon atoms, the other alkyl groups substituent to the aromatic nucleus in such products contain from about four to about twenty carbon atoms. The degree and type of surface activity varies of course according to the location and configuration of the aliphatic side chains and the presence or absence of hydrophylic groups other than the sulphonate group.

Those products of my invention which have definite detergent properties include water soluble salts of condensation products of propene sulphonic acids and of butene sulphonic acids with alkyl benzenes and alkyl phenols having from about ten to about fifteen carbon atoms in aliphatic side chains, and with alkyl naphthalenes having from about eight to about fifteen carbon atoms in aliphatic side chains.

Having thus described my invention, what I claim and desire to secure by Letters Patent is:

1. As new compositions of matter having detergent properties, water soluble salts of alkyl aromatic sulphonic acids of the general formula

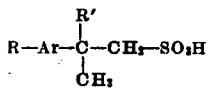

wherein R is an aliphatic group having about eight to fifteen carbon atoms, R' is selected from the group consisting of methyl and hydrogen, and Ar is selected from the group consisting of phenyl ($C_6H_4$) and naphthyl ($C_{10}H_6$).

2. As new compositions of matter having detergent properties, water soluble salts of $$R \cdot C_6H_4 \cdot C(CH_3)_2 \cdot CH_2SO_3H$$

wherein R is an aliphatic group having about eight to fifteen carbon atoms.

3. As new compositions of matter having detergent properties, water soluble salts of

wherein R is an aliphatic group having about eight to fifteen carbon atoms.

4. As new compositions of matter having detergent properties, water soluble salts of $$R \cdot C_6H_4 \cdot CH(CH_3) \cdot CH_2SO_3H$$

wherein R is an aliphatic group having about eight to fifteen carbon atoms.

5. As a new composition of matter having detergent properties, $R \cdot C_6H_4 \cdot C(CH_3)_2 \cdot SO_3Na$, wherein R represents an aliphatic side chain of the type found in commercial "undecylbenzene."

6. The process of forming alkyl aromatic sulphonic acids whose water soluble salts have detergent properties, which comprises condensing an olefin sulphonic acid, selected from the group consisting of propylene sulphonic acid and isobutylene sulphonic acid, with an alkyl aromatic compound, selected from the group consisting of alkyl benzenes and alkyl naphthalenes having about eight to fifteen carbon atoms in the aliphatic side chains.

7. The process of claim 6, conducted in the presence of a suitable polar halogenated hydrocarbon solvent.

8. The process of claim 6, conducted in the presence of the catalyst boron trifluoride.

9. The process of forming alkyl aromatic sulphonic acids whose water soluble salts have detergent properties, which comprises condensing an olefin sulphonic acid, selected from the group consisting of propylene sulphonic acid and isobutylene sulphonic acid, with an alkyl aromatic compound, selected from the group consisting of alkyl benzenes and alkyl naphthalenes having about eight to fifteen carbon atoms in the aliphatic side chains, in the presence of a suitable polar halogenated hydrocarbon solvent and boron trifluoride.

10. The process of forming alkyl aromatic sulphonic acids whose water soluble salts have detergent properties which comprises reacting a sodium olefin sulphonate, selected from the group consisting of sodium propylene sulphonate and sodium isobutylene sulphonate, at least a molar equivalent proportion of concentrated sulphuric acid, and an alkyl aromatic compound selected from the group consisting of alkyl benzenes and alkyl naphthalenes having about eight to fifteen carbon atoms in the aliphatic side chains, in the presence of a suitable polar halogenated hydrocarbon solvent and boron trifluoride.

11. The process of forming alkyl benzene sulphonic acids whose water soluble salts have detergent properties, which comprises condensing isobutylene sulphonic acid with an alkyl benzene having about eight to fifteen carbon atoms in its aliphatic side chain.

12. The process of forming alkyl benzene sulphonic acids whose water soluble salts have detergent properties, which comprises condensing propylene sulphonic acid with an alkyl benzene having about eight to fifteen carbon atoms in its aliphatic side chain.

CHESTER MERLE SUTER.